United States Patent
Burbo et al.

(10) Patent No.: US 11,855,974 B2
(45) Date of Patent: Dec. 26, 2023

(54) INTEGRATED CONTENT PORTAL FOR ACCESSING AGGREGATED CONTENT

(71) Applicant: T-Mobile USA, Inc., Bellevue, WA (US)

(72) Inventors: Michael Burbo, Kenmore, WA (US); Nicholas Seitz, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/167,993

(22) Filed: Feb. 4, 2021

(65) Prior Publication Data

US 2022/0247734 A1    Aug. 4, 2022

(51) Int. Cl.
*H04L 9/40* (2022.01)
*G06F 21/62* (2013.01)

(52) U.S. Cl.
CPC ...... *H04L 63/0815* (2013.01); *G06F 21/6218* (2013.01); *H04L 63/0807* (2013.01); *H04L 63/102* (2013.01); *G06F 2221/2141* (2013.01); *H04L 2463/101* (2013.01)

(58) Field of Classification Search
CPC ............ H04L 63/0815; H04L 63/0807; H04L 63/102; H04L 2463/101; G06F 21/6218; G06F 2221/2141
See application file for complete search history.

(56) References Cited

U.S. PATENT DOCUMENTS

| | | | |
|---|---|---|---|
| 6,553,413 B1 | 4/2003 | Leighton et al. | |
| 7,035,854 B2 | 4/2006 | Hsiao et al. | |
| 8,122,098 B1 | 2/2012 | Richardson et al. | |
| 9,794,647 B1 * | 10/2017 | Delker | G06Q 30/0269 |
| 11,431,720 B1 * | 8/2022 | Mesard | H04L 9/3226 |
| 2014/0282851 A1 * | 9/2014 | Miller | H04L 67/36 |
| | | | 726/1 |

(Continued)

OTHER PUBLICATIONS

Ferman et al. Multimedia content recommendation engine with automatic inference of user preferences. IEEE, Sep. 14-17, 2003 [retrieved on Feb. 4, 2021] Retrieved from the Internet URL: <https://www.researchgate.net/publication/4044682_Multimedia_content_recommendation_engine_with_automatic_inference_of_user_preferences>.

(Continued)

*Primary Examiner* — Phuoc H Nguyen
*Assistant Examiner* — Steven C Nguyen (57) ABSTRACT

Described herein are techniques for providing one or more users with access to content obtained from a plurality of content providers. In some embodiments, such techniques may comprise maintaining a number of access credentials associated with a plurality of different content providers, obtaining access to a plurality of media content libraries, each of the plurality of media content libraries managed by a content provider of the plurality of different content providers, and providing the plurality of media content libraries to at least one user device as a single library of media content. Such techniques may further comprise receiving, from the user device, a selection of a media content from the single library of media content and providing, to the user device, access to the selected media content within a corresponding media content library of the plurality of media content libraries using an access credential.

19 Claims, 5 Drawing Sheets

(56) References Cited

U.S. PATENT DOCUMENTS

| | | | |
|---|---|---|---|
| 2015/0201023 A1* | 7/2015 | Kotab | H04L 65/4084 |
| | | | 709/208 |
| 2016/0088068 A1* | 3/2016 | Toy | H04L 63/0272 |
| | | | 709/219 |
| 2017/0013295 A1* | 1/2017 | Wertheimer | H04N 21/2393 |
| 2017/0223408 A1* | 8/2017 | Asnis | H04N 21/4122 |
| 2018/0034876 A1* | 2/2018 | Sarkic | G06F 16/24568 |
| 2018/0084306 A1* | 3/2018 | Hunter | H04N 21/25808 |
| 2018/0173856 A1* | 6/2018 | Ahmed | H04L 63/0815 |
| 2018/0270294 A1* | 9/2018 | Akkaraju | H04L 67/62 |
| 2019/0141399 A1* | 5/2019 | Auxer | H04N 21/4753 |
| 2020/0068399 A1* | 2/2020 | Brown | H04L 9/3236 |
| 2020/0267435 A1* | 8/2020 | Gordon | H04N 21/4788 |
| 2021/0014212 A1* | 1/2021 | Staker | H04L 63/10 |
| 2022/0116399 A1* | 4/2022 | Carrigan | H04N 21/232 |
| 2022/0210517 A1* | 6/2022 | Newman | H04N 21/4828 |

OTHER PUBLICATIONS

What is Plex?. Support.Plex.TV [retrieved on Feb. 4, 2021] Retrieved from the Internet URL: <https://support.plex.tv/articles/200288286-what-is-plex>.

* cited by examiner

INTEGRATED CONTENT PORTAL FOR ACCESSING AGGREGATED CONTENT

BACKGROUND

Media content (such as television and radio) is now more accessible to more users than it has ever been. Users can now consume a variety of different types of content at their convenience and from almost anywhere. As the amount of content consumed by users has increased, so too has the number of providers of such content. However, in order to access the variety of content available to users, those users may be required to maintain a multitude of accounts with a multitude of content providers.

SUMMARY

Techniques are provided herein for providing a user device with access to content available from a multitude of content providers from a single source. In some embodiments, accounts may be maintained with a multitude of different content providers. The accounts may be used to access information maintained by the multitude of different content providers in order to aggregate that information into a single content library. The content library may then be used by a user device to access a particular piece of media content using the access credentials.

Embodiments of the disclosure provide several advantages over conventional systems. For example, embodiments of the system described herein enable a user to access media content available from a multitude of different content providers without requiring that the user maintain accounts with each of the multitude of different content providers. Embodiments of the disclosure further enable content providers to provide content to users that do not have accounts with those content providers.

In one embodiment, a method is disclosed as being performed by a content integration platform, the method comprising maintaining a number of access credentials associated with a plurality of different content providers, obtaining access to a plurality of media content libraries, each of the plurality of media content libraries managed by a content provider of the plurality of different content providers, providing the plurality of media content libraries to at least one user device as a single library of media content, receiving, from the user device, a selection of a media content from the single library of media content, and providing, to the user device, access to the selected media content within a corresponding media content library of the plurality of media content libraries using an access credential of the number of access credentials.

An embodiment is directed to a computing device comprising: a processor; and a memory including instructions that, when executed with the processor, cause the computing device to maintain a number of access credentials associated with a plurality of different content providers, obtain access to a plurality of media content libraries, each of the plurality of media content libraries managed by a content provider of the plurality of different content providers, provide the plurality of media content libraries to at least one user device as a single library of media content, receive, from the user device, a selection of a media content from the single library of media content, and provide, to the user device, access to the selected media content within a corresponding media content library of the plurality of media content libraries using an access credential of the number of access credentials.

An embodiment is directed to a non-transitory computer-readable media collectively storing computer-executable instructions that upon execution cause one or more computing devices to perform acts comprising maintaining a number of access credentials associated with a plurality of different content providers, obtaining access to a plurality of media content libraries, each of the plurality of media content libraries managed by a content provider of the plurality of different content providers, providing the plurality of media content libraries to at least one user device as a single library of media content, receiving, from the user device, a selection of a media content from the single library of media content, and providing, to the user device, access to the selected media content within a corresponding media content library of the plurality of media content libraries using an access credential of the number of access credentials.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to provide access to media content maintained by a multitude of content providers. In some embodiments, accounts may be maintained by a content integration platform with the multitude of content providers. Such accounts may be used to access information on media content hosted by the multitude of content providers in order to aggregate that information into a single content library.

The content integration platform may receive a request from a user device to access a particular piece of media content hosted by a content provider as included within the single content library. In some embodiments, the content integration platform may use the access credentials maintained in association with the respective content provider to access the particular piece of media content. The content integration platform may then convey the accessed media content to the user device from which the request originated.

Figure 1:
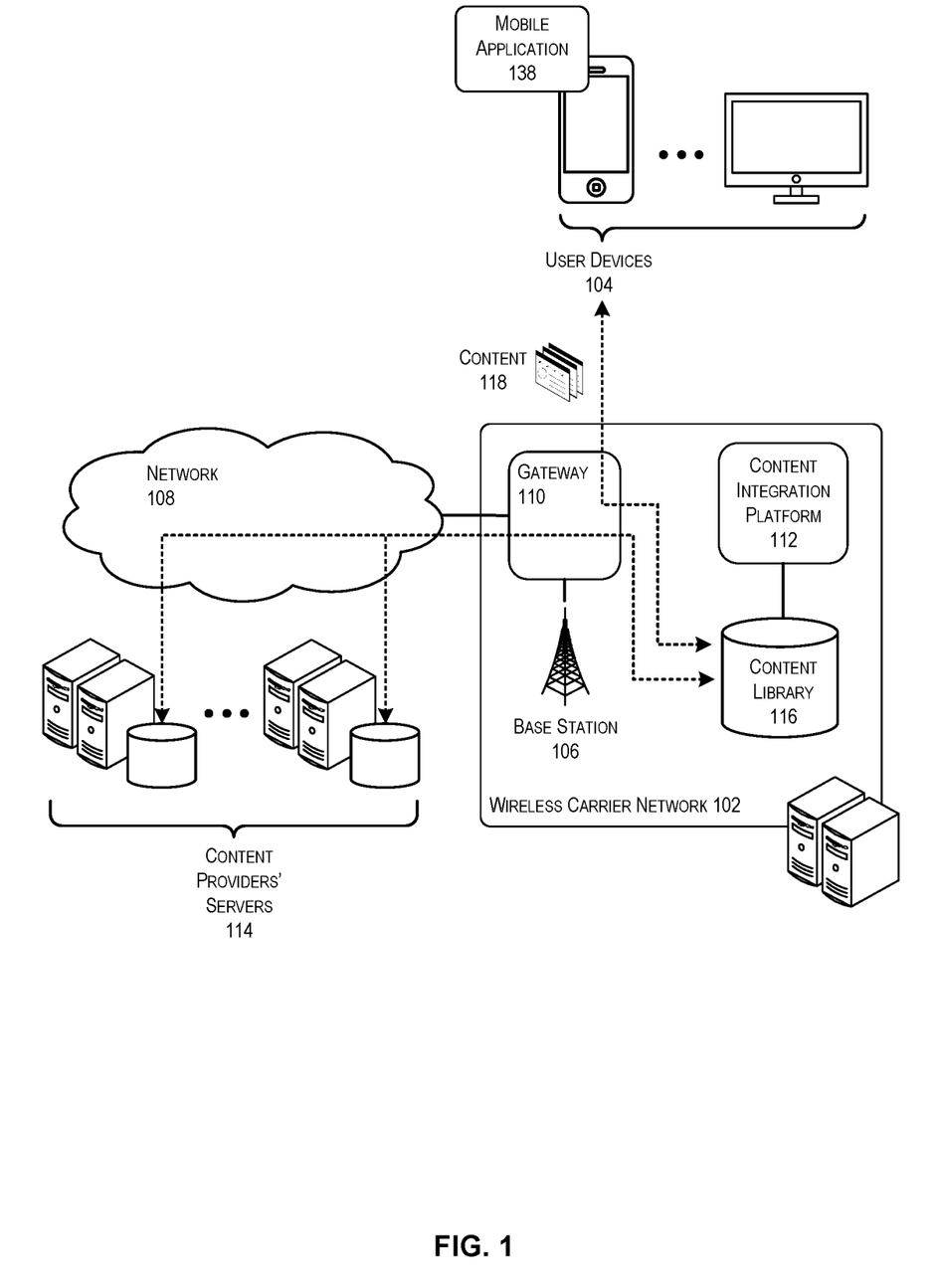
FIG. 1 illustrates an example architecture of a wireless carrier network for implementing techniques for enabling access to aggregated streaming media content in accordance with embodiments of the disclosure.

FIG. 1 illustrates an example architecture of a wireless carrier network for implementing techniques for enabling access to aggregated streaming media content in accordance with embodiments of the disclosure. The architecture 100 may include a wireless carrier network 102 that serves multiple user devices, such as user device 104.

The wireless carrier network 102 may include multiple base stations, such as the base station 106, as well as a computing environment having multiple hardware and software components. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long-term Evolution (LTE), CDMA-2000 (Code Division Multiple Access 2000), $4^{th}$ Generation (4G), $5^{th}$ Generation (5G), and/or so forth. The base stations are responsible for handling data traffic between user devices and one or more components of a computing environment associated with the wireless carrier network. In some embodiments, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices.

The wireless carrier network 102 may provide telecommunication and data communication services to one or more user devices 104. For example, the wireless carrier network 102 may connect the user devices 104 to other telecommunication and data communication networks, such as a network 108 and/or a public switched telephone network (PSTN). Accordingly, data packet communications via the wireless carrier network 102 and the network 108 may support a variety of services provided via a remote connection. The wireless carrier network 102 may include a gateway 110 that routes data packet communication network traffic that is handled by the wireless carrier network.

In various embodiments, a wireless carrier network 102 may include one or more application functions configured to interact with data packet communications routed over the wireless carrier network. Such application functions may include a Proxy Call Session Control Function (P-CSCF), Interrogating Call Session Control Function (I-CSCF), Serving Call Session Control Function (S-CSCF) or an equivalent function. In instances in which the application functions include the P-CSCF, the P-CSCF may route incoming SIP messages to an IMS registrar server. The P-CSCF may also safeguard the security of the wireless carrier network 102 by handling Internet Protocol Security (IPSec) for communications that are exchanged by the user devices 104. In some alternative instances, instead of SIP sessions, the P-CSCF may handle Remote Authentication Dial-In User Service (RADIUS) sessions. The P-CSCF may interact with the I-CSCF and S-CSCF. The S-CSCF may communicate with a telephony application server (TAS) that resides in the wireless carrier network 102. The TAS may route voice and/or data communications within the wireless carrier network 102 and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth. The application functions may further include content integration platform 112 configured to aggregate media content available from a number of content providers' servers 114 into a content library 116 and provide access to that aggregated media content to a user device 104. This is described in greater detail below.

The gateway 110 may include one or more servers and related components that are tasked with providing connectivity between the wireless carrier network 102, the user devices 104, and one or more content providers' servers 114 by acting as a point of entry and exit (i.e., an egress/ingress point) for data traffic. In turn, the wireless carrier network 102 may provide the user devices with data access to external packet data networks 108, such as the networks of other wireless telecommunication providers or the Internet. Accordingly, the gateway 110 may perform functions such as policy enforcement, packet filtering, packet screening, and/or charging support. In various embodiments, the gateway 110 may be a Packet Data Network Gateway (PGW) or another equivalent core network component of the wireless carrier network 102.

A user device 104 may be any suitable electronic device capable of interacting with at least one other electronic device (e.g., content providers' servers 114) in order to consume online services. In some embodiments, the user device 104 may include one or more outputs (e.g., a display, speakers, etc.) via which multimedia content may be presented to a user. Additionally, the user device 104 may include one or more input devices configured to collect input from a user of the user device. The user device 104 may include a memory that stores computer executable instructions. Such a user device 104 may include TVs and/or set top boxes associated with TVs, game consoles, mobile computing devices such as smart phone or tablets, smart watches, head-mounted displays (HMD), digital assistant devices, smart appliances, and/or other devices suitable for playing streaming media content. The user devices 104 may be further configured to communicate with each other via short-range communication channels.

One or more of the user devices 104 may have installed upon them an instance of a mobile application 118. In some embodiments, the mobile application 118 may be configured to enable the user device to access content within a content library 116 as made available by one or more content providers servers 114. In some embodiments, the mobile application 118 may be associated with the wireless carrier network 102, in that the mobile application is maintained by that wireless carrier network and is configured to enable interaction between the user device and one or more computing devices of the wireless carrier network. In some embodiments, a mobile application 118 may be configured to enable the user device to interact with a content integration platform 112 in order to access media content made available by such a platform.

The content integration platform 112 may be configured to aggregate content available from a number of content providers, such that the aggregated content 118 may be accessed by a user via a user device. In some embodiments, aggregated content may be content that is obtained from the content providers' servers 114 and stored locally within a data store of the content library 116. In these embodiments, a user may be provided with a catalogue or other suitable data directory listing the media content that is stored in the content library. Upon receiving a selection of a particular media content stored in the content library, the content integration platform 112 may direct a user device from which the request was received to a location of the selected media content within the content library.

In some embodiments, the aggregated content may comprise a directory indicating one or more references to locations at which the media content may be accessed (e.g., outside of the wireless carrier network 102) and/or a data store of cryptographic keys that may be used to access certain media content. For example, one or more content providers may maintain a network of computing devices (e.g., an edge node network) on which its content is stored and from which that content may be accessed. In this example, the content library 116 may include a listing of locations at which various media content is located. In some embodiments, a particular piece of media content may be stored at multiple different locations within the network of computing devices. In at least some of these embodiments, a user device that requests a particular piece of media content from the content library may be directed to a location within the network of computing devices that is most physically proximate and/or experiencing the least amount of network congestion.

In some embodiments, the content integration platform 112 may maintain a number of accounts with various content providers. For example, the content integration platform 112 may maintain a set of login credentials (e.g., username and password) for each of a number of content providers. In this example, the content integration platform 112 may log into an account with one or more of the content providers in order to gain access to content hosted on the content providers' servers 114. In some embodiments, the content integration platform 112 may interact with one or more content providers' servers via application programming interfaces (APIs) associated with the one or more content providers' servers.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
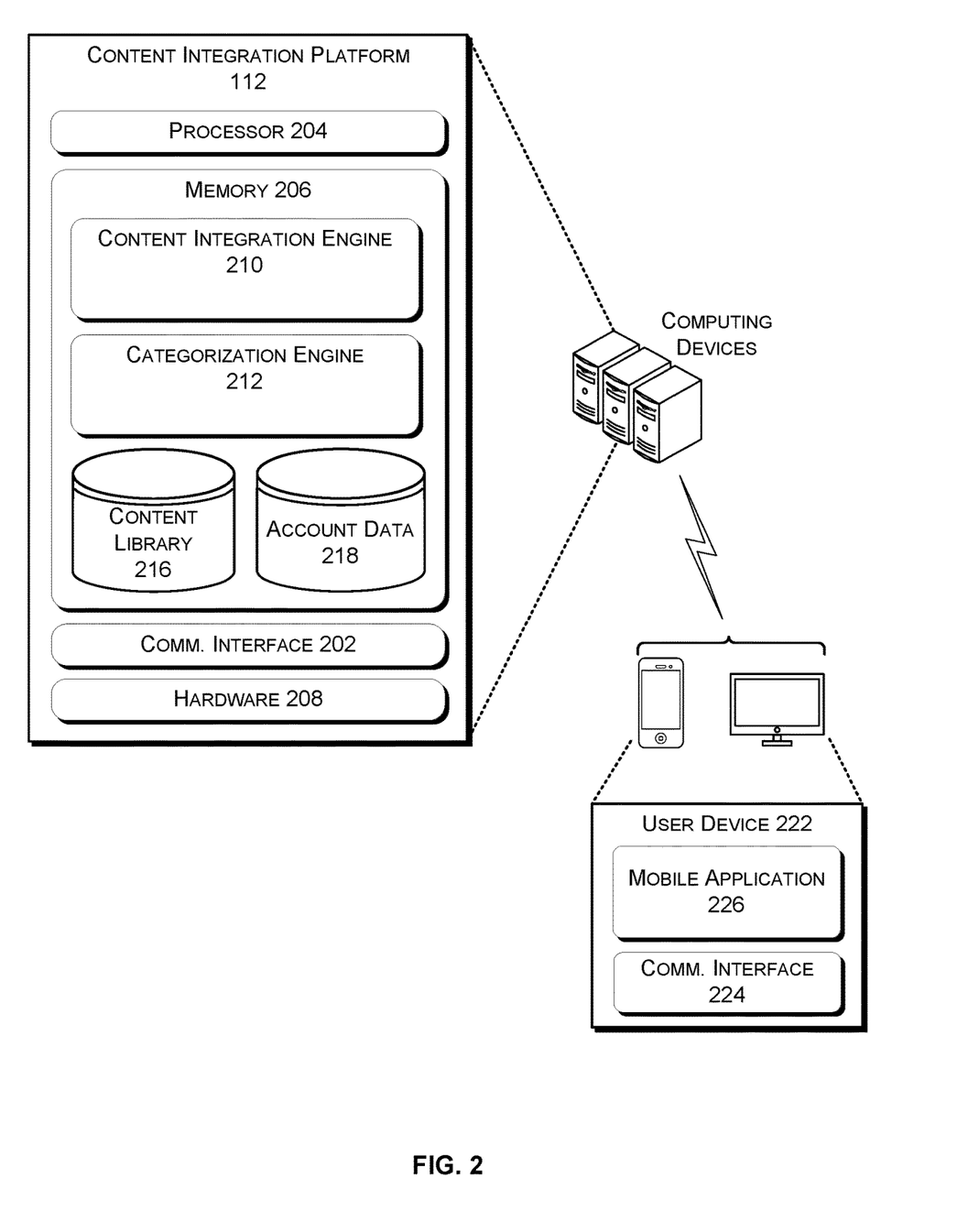
FIG. 2 is a block diagram showing various components of a computing system architecture that supports aggregation and distribution of media content from a plurality of different content providers.

FIG. 2 is a block diagram showing various components of a computing system architecture that supports aggregation and distribution of media content from a plurality of different content providers. The system architecture may include a content integration platform 112 that comprises one or more computing devices. The content integration platform 112 may include a communication interface 202, one or more processors 204, memory 206, and hardware 208. The communication interface 202 may include wireless and/or wired communication components that enable the content integration platform 112 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The content integration platform 112 can include any computing device configured to perform at least a portion of the operations described herein. The content integration platform 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The content integration platform 112 can include one or more virtual machines running virtual operating systems, or other computing architectures involving virtualization such as one or more flexible pools of logical storage devices that can be virtualized to maintain virtual storage devices for the computer. For example, the content integration platform 112 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the content integration platform 112 may implement functionality that includes one or more software modules and data stores. Such software modules may include routines, program instructions, objects, and/or data structures that are executed by the processors 204 to perform particular tasks or implement particular data types. More particularly, the memory 206 may include a module that is configured to integrate media content received from a number of different content providers into a single aggregated library (content integration engine 210) as well as a module that categorizes media content in order to establish logical groupings of that content (categorization engine 212). Additionally, the memory 206 may include various data stores. For example, the memory 206 may include a directory of media content (content library 216) as well as information about user accounts and associated user devices (account data 218).

The content integration engine 210 may be configured to, in conjunction with the processor 204, integrate media content available from a number of different content providers into a single aggregated content library. In some embodiments, this may comprise collecting and storing data files associated with the media content within one or more data stores maintained by the content integration platform. For example, the content integration module 210 may include a workflow scheduler that periodically checks for and retrieves newly available data from the content sources of multiple content providers. The workflow scheduler may handle the extraction and handling of the data based on configurable policies. For example, a configurable policy may specify the source data location, frequency of data retrieval, handling procedures for late arrival data, data retention period, and data disposal following the expiration of the data retention period. The handling procedures for the late arrival data may specify a predetermined cutoff period during which any data arriving late may be incorporated with data that is retrieved on time for processing. In various embodiments, the content integration module 210 may employ file transfer protocol (FTP), Hypertext Transfer Protocol (HTTP) posts, direct network infrastructure element connection, and/or other data transfer techniques to obtain the available content from the content sources. In some cases, file formats for one or more of the media content may be changed to a format that is standard for the aggregated content library. For example, the content integration engine 210 may use an encoding algorithm or re-encoding algorithm to change a file format, an encoding resolution, and/or an encoding bitrate of the media content. In other embodiments, this may comprise identifying a number of data files associated with media content accessible via the content providers and recording a location at which each of the identified number of data files is stored by the respective content provider. In such embodiments, this may further comprise obtaining, from each of the content providers, one or more cryptographic keys that may be used to access the data files in the locations at which those data files are stored by the content providers. For example, the cryptographic keys may include symmetric or asymmetric keys.

The categorization engine 212 may be configured to, in conjunction with the processor 204, determine and maintain logical groupings of media content. For example, the categorization engine 212 may identify a number of different media content files accessible via different content providers that belong to a common category (e.g., video content, audio content, text content, etc.). In this example, the common category may be recommended to a user or the user may subscribe to that common category, such that the user can quickly be provided a grouping of media content that spans a number of different content providers but belongs to the common category. In some embodiments, a user may be provided a recommendation for a category based on one or more traits associated with that user.

As noted elsewhere, the content integration platform 112 may be in communication with a number of user devices 222. Such a user device 222 may be any electronic device capable of interacting with the content integration platform 112 as described herein and capable of presenting media content to a user. User devices 222 may be examples of user devices 104 as described with respect to FIG. 1 above. The user device 222 may include a processor and a computer readable memory as well as a communication interface 224. The computer readable memory of the user device 222 may include a mobile application 226 that enables streaming of content received from the content integration platform. Additionally, the mobile application 226 may enable (e.g., via a graphical user interface) interaction between a user of the user device and the content integration platform. For example, execution of the mobile application on the user device may cause a communication session to be established between the user device and the content integration platform. In this example, the content integration platform may provide information to the user device via the communication session that is then presented on the user device. In some embodiments, the mobile application is configured to interact with the content integration platform using an application programming interface (API) 230 associated with the content integration platform.

The communication interface 224 may include wireless and/or wired communication components that enable the user devices to transmit or receive data via a network, such as the Internet. In some embodiments, the communication interface 224 may include both short-range and long-range communication channels. In some embodiments, communications between user devices may be established via a short-range communication channel of the communication interface 224 whereas communications between a user device and the content integration platform 112 may be established via a long-range communication channel.

Figure 3:
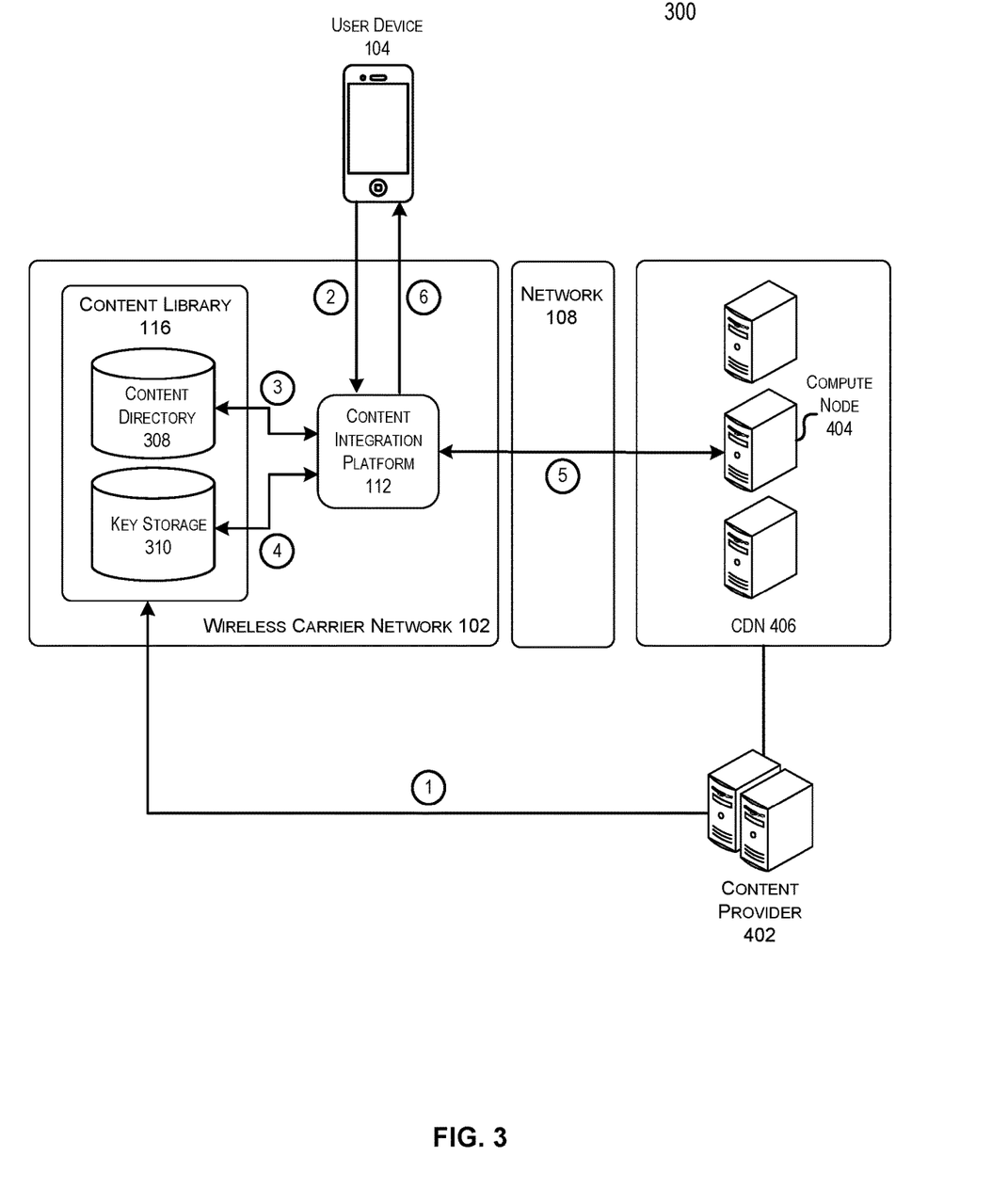
FIG. 3 depicts a flow diagram showing an example process representing interactions between various components of a system as described herein in order to provide access to media content within an aggregated media content library.

FIG. 3 depicts a flow diagram showing an example process 300 representing interactions between various components of a system as described herein in order to provide access to media content within an aggregated media content library. In particular, the example process may comprise interactions between at least one user device 104, a wireless carrier network 102, and one or more content provider 302.

The one or more content provider 302 may maintain stored media content that may be accessed by users of the content provider via a user device. In some embodiments, such media content may be maintained by the content provider on one or more compute nodes 304 within a content delivery network (CDN) 306. A CDN, also referred to as a content distribution network, is a group of geographically distributed and interconnected compute nodes that provide cached media content. In some embodiments, the CDN may provide access to content from a network location closest to a user device in order to accelerate its delivery.

The CDN 306 may be accessed via an external network, such as network 108 as described with respect to FIG. 1 above. In some embodiments, one or more compute nodes, referred to as edge nodes, may provide ingress/egress to other compute nodes within the CDN.

As noted elsewhere, a wireless carrier network 102 may include a content integration platform 112 as well as a content library 116. In some embodiments, such a content library may be comprised of a content directory 308 as well as a cryptographic key storage 310. In these embodiments, the content directory 308 may maintain a directory of media content available within the CDN as well as a mapping to corresponding locations of the media content within the CDN.

The example process 300 represented by interactions between the various components of the system are depicted as a series of steps. At step 1 of the process 300, at least a portion of the content library may be populated with information about media content available from one or more content provider.

In some embodiments, the content library may be populated by the content provider 302. For example, the content provider 302 may provide a batch of media content information to the content integration platform 112 that is then populated into the content library. In some embodiments, the content provider may provide such a batch of media content information on a periodic basis (e.g., hourly, daily, weekly, etc.).

In some embodiments, the content library may be populated by the content integration platform 112. In at least some of these embodiments, the content integration platform may interact with the content provider (e.g., via an application programming interface associated with the content provider) in order to retrieve the media content information as presented by the content provider. In some embodiments, the content integration platform may access an interface for the content provider and scrape information about the media content available via that content provider from the interface in order to populate that information into the content library.

At step 2 of the process 300, the content integration platform 112 may receive a request to access media content available from the content library. In some embodiments, such a request may be received at the content integration platform upon execution of a mobile application upon the user device. In this example, the mobile application may cause, upon execution, the user device to establish a communication session with the content integration platform. Once such a communication session has been established, information may be provided to the user device by the content integration platform and presented to a user via a graphical user interface of the mobile application. In some embodiments, the content integration platform may receive a selection of media content to be played on the user device at step 2.

At step 3 of the process 300, the content integration platform may, upon receiving a request to access a particular piece of media content, access the content directory 308 to determine a location in memory of the requested piece of media content. In some embodiments, such a location in memory may comprise a uniform resource locator (URL) or other reference link.

At step 4, the content integration platform may access a key storage 310 to retrieve a cryptographic key associated with the requested media content. In some embodiments, media content maintained by the content provider may be cryptographically secured (e.g., encrypted) in storage. In some embodiments, each piece of media content may be associated with a different cryptographic key that may be used to access that media content. In some embodiments, each content provider may be associated with a different cryptographic key that may be used to access media content from that content provider.

At step 5, the requested media content may be accessed within the content delivery network at the location determined in step 3. In some embodiments, one or more access credentials may be used to access the media content at the determined location. For example, the content integration platform may provide a login and password that may be used to access an account maintained by the content integration platform. In some embodiments, this may comprise retrieving the stored media data from the determined location and passing that retrieved data to the user device at step 6. The data may be retrieved at the determined location within the CDN over a network connection over network 108 and then passed to the user device via the wireless carrier network 102.

Figure 4:
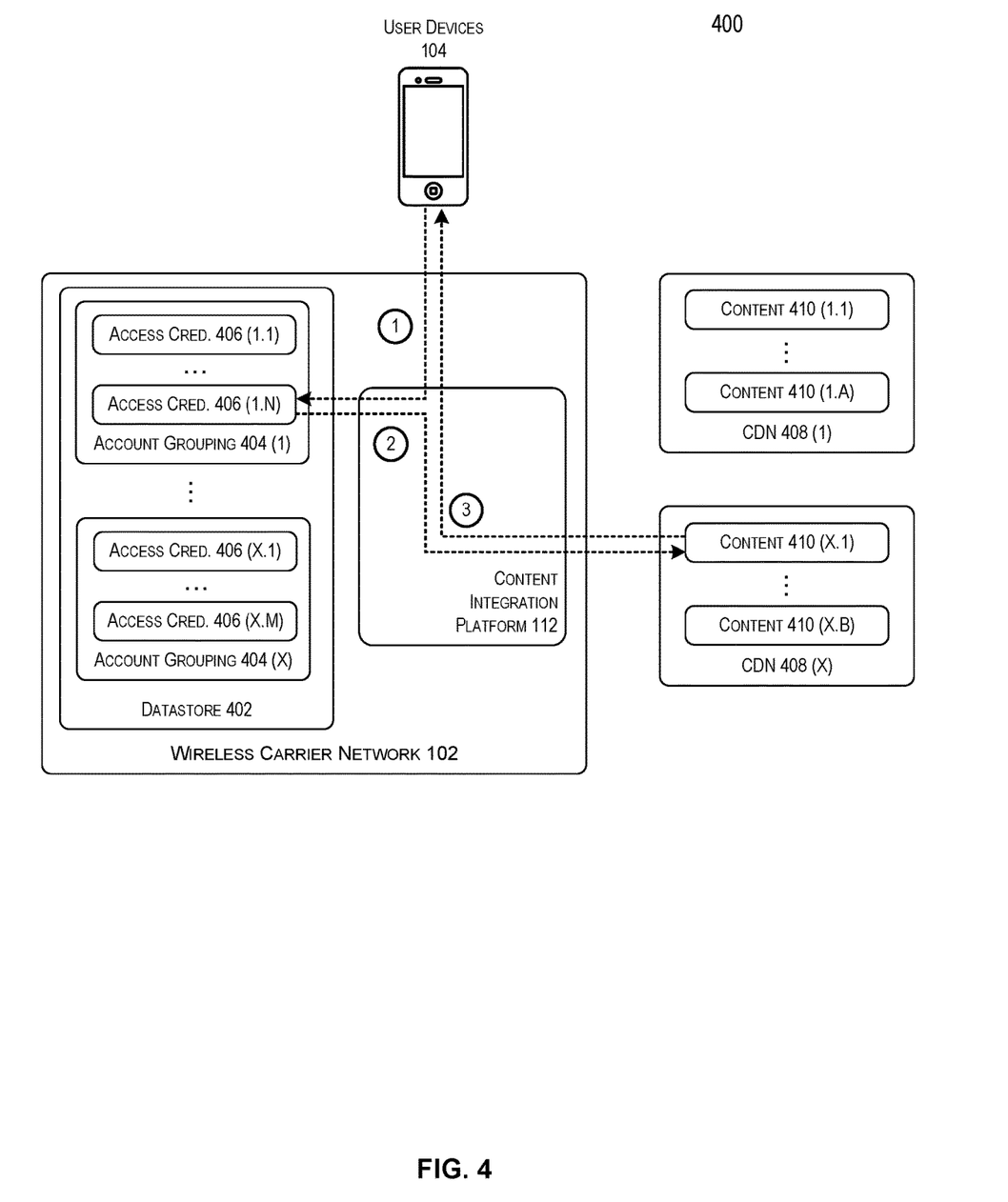
FIG. 4 depicts a flow diagram showing an example process representing interactions between various components of a system as described herein in order to provide a user device access to media content available from a number of content providers.

FIG. 4 depicts a flow diagram showing an example process 300 representing interactions between various components of a system as described herein in order to provide a user device access to media content available from a number of content providers. In particular, the example process may comprise interactions between a wireless carrier network 102 and one or more content delivery networks associated with various content providers.

The example process 400 represented by interactions between the various components of the system are depicted as a series of steps. In some embodiments, the wireless carrier network 102 may maintain a number of accounts with various content providers. Each of the maintained accounts may be associated with access rights to digital media content stored by a respective content provider. In some embodiments, account information may be stored in a datastore 402. In some cases, the account information may be stored in account groupings 404 (1-X). In this example, X may represent the total number of content providers from which media content information is to be obtained, such that each account grouping includes a number of access credentials associated with one of the content providers.

Each such account grouping may include a number of access credentials 406 (e.g., login and password) that may be used to access media content available from the respective content provider. In some embodiments, the number of access credentials maintained with respect to each of the content providers may vary per content provider. In some cases, the number of access credentials on behalf of each content provider may be varied based on a popularity of that content provider. For example, a number N of access credentials (e.g., access credentials (1.1-1.N)) may be maintained for a first account grouping 404 (1) whereas a different number M of access credentials (e.g., access credentials (X.1-X.M)) may be maintained for a second account grouping 404 (X).

As previously noted, the wireless carrier network 102 may be in communication with a number (e.g., X) of content providers. In some embodiments, each of that number of content providers manages a CDN 408 (e.g., CDN 408 (1-X)) that manages access to media content on behalf of that content provider. The amount of content managed by each of the CDNs may vary. For example, CDN 408 (1) may manage a number A of media content data files (e.g., content (1.1-1.A)) whereas the CDN (X) may manage a different number B of media content data files (e.g., content (X.1-X.B)).

At step 1 of the process 400, a content integration platform may receive a request from a user device 104 to access media content hosted by a content provider. Upon receiving such a request, the content integration platform may identify a content provider associated with the requested media content (e.g., via a content library). The content integration platform may then identify and retrieve a set of access credentials associated with the identified content provider. In some embodiments, the content integration platform may retrieve a set of access credentials that are not currently in use.

Once a set of access credential associated with the content provider has been retrieved, the content integration platform may use those retrieved access credentials to access the requested media content within an appropriate CDN associated with the identified content provider at step 2 of the process 400.

At step 3 of the process 400, the content integration platform relays the accessed media content to the user device. In some embodiments, the accessed media content is caused to be presented on the user device via a graphical user interface instantiated via execution of a mobile application associated with the content integration platform.

Figure 5:
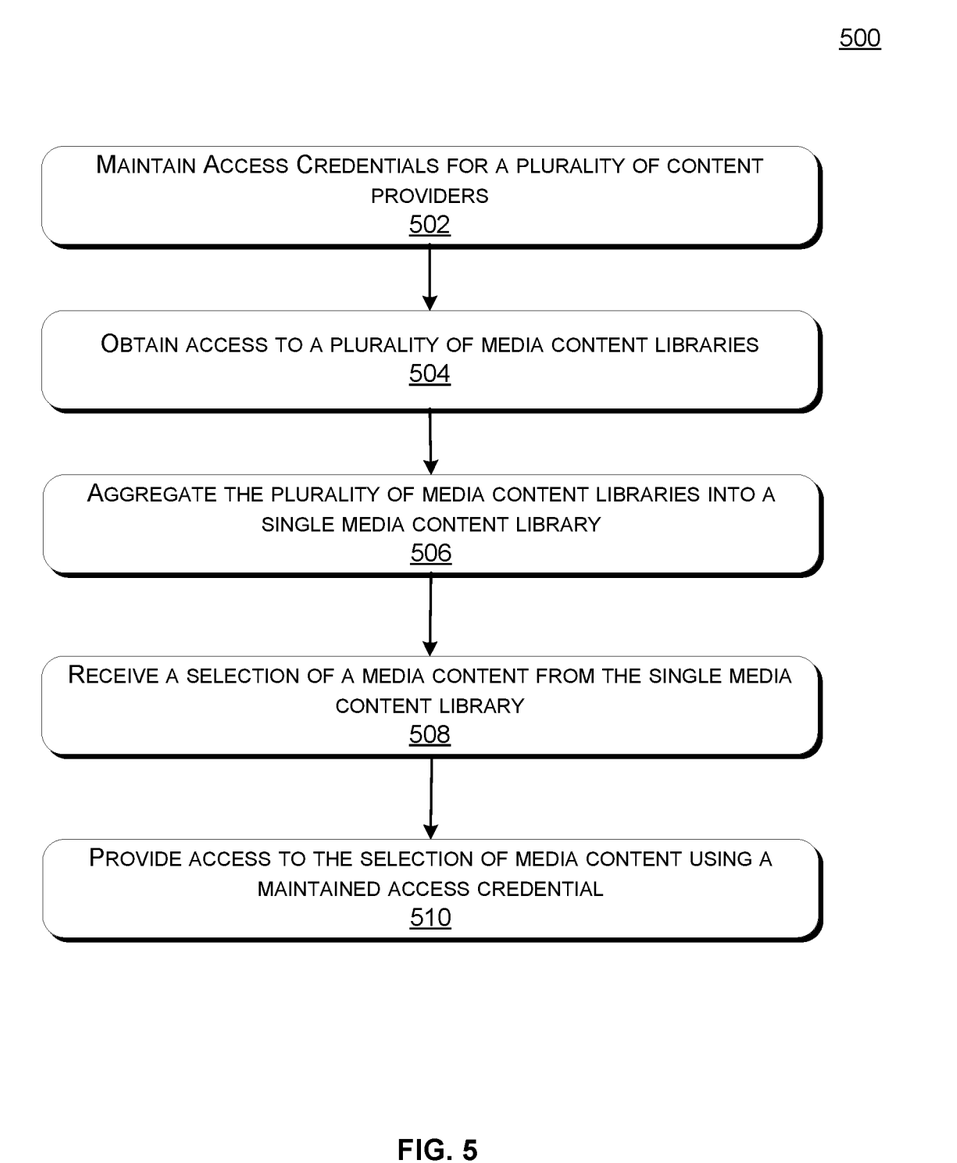
FIG. 5 depicts a block diagram showing an example process flow for providing access to media content within an aggregated library of media content in accordance with some embodiments.

FIG. 5 depicts a block diagram showing an example process flow for providing access to media content within an aggregated library of media content in accordance with some embodiments. In accordance with embodiments, the process 500 may be performed by components within a wireless carrier network 102 as discussed with respect to FIG. 1 above. For example, the process 500 may be performed by a content integration platform 112 as described with respect to FIG. 1 above.

At 502, the process 500 comprises maintaining access credentials for a plurality of content providers. In some embodiments, the plurality of different content providers are providers of streaming video services. In some embodiments, the number of access credentials comprise a number of cryptographic keys used to access the media content in the plurality of media content libraries. In some embodiments, the content integration platform maintains at least one account with each of the plurality of different content providers and the access credentials comprise login details corresponding to the at least one account.

At 504, the process 500 comprises obtaining access to a plurality of media content libraries maintained by the plurality of content providers. In some embodiments, access to the plurality of media content libraries is obtained by logging into an account maintained with each of the content providers using access credentials associated with the account. Once logged into the account, information about various media content hosted by the content providers is accessed (e.g., via a menu or other suitable directory presented by the content provider).

At 506, the process 500 comprises aggregating the plurality of media content libraries into a single media content library. In some embodiments, the single library of media content is caused to be presented on a user device via a user interface associated with the content integration platform. In some embodiments, the user device is associated with an account maintained by the content integration platform.

At 508, the process 500 comprises receiving a selection of a media content from the single media content library. For example, upon being presented with a menu or other directory that includes information on one or more media content, a user of the user device may select a particular piece of media content to be played on the user device. This selection of a piece of media content may then be provided to the content integration platform.

At 510, the process 500 comprises providing access to the selected media content using an access credential maintained with respect to a corresponding content provider. In some embodiments, this may comprise accessing the media content at a location in memory at which the media content is maintained by the content provider. Once accessed, the media content may be streamed to the user device via a communication session established over a wireless carrier network.

It should be noted that while the disclosure focuses on aggregating media content from a number of content providers, such a system may be used to aggregate other types of services for which access may be granted to a user on a per request basis. For example, memberships for a gym or other service provider may be aggregated by a content integration platform as described. Upon receiving a request from a user to access the service, a determination may be made as to whether a membership is available and, if so, may provide access to the available membership. In this example, the platform may maintain a threshold number of gym memberships and the user may be provided access to a gym membership only if nine or less of the ten gym memberships are currently being used.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
storing, in a data store of a wireless carrier network, a number of access credentials of accounts maintained for use by a plurality of users without corresponding accounts with a plurality of different content providers to access media contents of the plurality of different content providers;
obtaining, at a content integration platform, access to each of a plurality of media content libraries of the plurality of different content providers via a corresponding access credential of a corresponding account for each content provider;
presenting, via the content integration platform, the plurality of media content libraries of the plurality of different content providers to a user device as a single library of media content;
receiving, at the content integration platform from the user device, a selection of a media content from the single library of media content;
identifying, via the content integration platform, a selected content provider associated with the media content from the plurality of different content providers;
identifying, at the content integration platform, an access credential for accessing the media content of the selected content provider from the access credentials maintained for use by the plurality of users without corresponding accounts;
retrieving, by the content integration platform, the access credentials for accessing the media content of the selected content provider from the data store of the wireless carrier network to provide the user device with access to the media content;
accessing, via the content integration platform, the media content at the selected content provider using the access credential of the selected content provider; and
providing, by the content integration platform to the user device, access to the selected media content of the selected content provider.

2. The method of claim 1, wherein the plurality of different content providers are providers of streaming video services.

3. The method of claim 1, wherein the number of access credentials comprise a number of cryptographic keys used to access the media content in the plurality of media content libraries.

4. The method of claim 1, wherein the access credentials comprise login details corresponding to at least one account.

5. The method of claim 1, wherein the single library of media content is presented on the user device via a user interface associated with the content integration platform.

6. The method of claim 1, wherein the user device is associated with an account maintained by the content integration platform.

7. The method of claim 1, wherein obtaining access to the plurality of media content libraries comprises obtaining a list of resource locations and information about resources stored at the resource locations.

8. The method of claim 1, wherein the access credentials are identified by virtue of being not currently in use.

9. A system comprising:
a processor; and
a memory including instructions that, when executed with the processor, cause the system to, at least:
  store, in a data store of a wireless carrier network, a number of access credentials of accounts maintained for use by a plurality of users without corresponding accounts with a plurality of different content providers to access media content of the plurality of different content providers;
  obtain, at a content integration platform, access to each of a plurality of media content libraries of the plurality of different content providers via a corresponding access credential of a corresponding account maintained for each content provider;
  present, via the content integration platform, the plurality of media content libraries of the plurality of different content providers to a user device as a single library of media content;
  receive, at the content integration platform from the user device, a selection of a media content from the single library of media content;
  identify, via the content integration platform, a selected content provider associated with the media content from the plurality of different content providers;
  identify, at the content integration platform, an access credential for accessing the media content of the selected content provider from the access credentials maintained for use by the plurality of users without corresponding accounts;
  retrieve, by the content integration platform, the access credentials for accessing the media content of the selected content provider from the data store of the wireless carrier network to provide the user device with access to the media content;
  access, via the content integration platform, the media content at the selected content provider using the access credential of the selected content provider; and
  provide, by the content integration platform to the user device, access to the selected media content of the selected content provider.

10. The system of claim 9, wherein the plurality of different content providers are providers of streaming video services.

11. The system of claim 9, wherein the number of access credentials comprise a number of cryptographic keys used to access the media content in the plurality of media content libraries.

12. The system of claim 9, wherein the access credentials comprise login details corresponding to at least one account.

13. The system of claim 9, wherein the single library of media content is presented on the user device via a user interface associated with a content integration platform.

14. The system of claim 9, wherein the user device is associated with an account maintained by a content integration platform.

15. The system of claim 9, wherein obtaining access to the plurality of media content libraries comprises obtaining a list of resource locations and information about resources stored at the resource locations.

16. One or more A-non-transitory computer-readable media collectively storing computer-executable instructions that upon execution cause one or more computing nodes to collectively perform acts comprising:
  storing, in a data store of a wireless carrier network, a number of access credentials of accounts maintained for use by a plurality of users without corresponding accounts with a plurality of different content providers to access media content of the plurality of different content providers;
  obtaining, at a content integration platform, access to each of a plurality of media content libraries of the plurality of different content providers via a corresponding access credential of a corresponding account for each content provider;
  presenting, via the content integration platform, the plurality of media content libraries of the plurality of different content providers to a user device as a single library of media content;
  receiving, at the content integration platform from the user device, a selection of a media content from the single library of media content;
  identifying, via the content integration platform, a selected content provider associated with the media content from the plurality of different content providers;
  identifying, at the content integration platform, from the access credentials for use by the plurality of users without corresponding accounts, an access credential for accessing the media content of the selected content provider that is not currently in use;
  retrieving, by the content integration platform, the access credentials for accessing the media content of the selected content provider from the data store of the wireless carrier network to provide the user device with access to the media content;
  accessing, via the content integration platform, the media content at the selected content provider using the access credential of the selected content provider; and
  providing, by the content integration platform to the user device, access to the selected media content of the selected content provider.

17. The one or more non-transitory computer-readable media of claim 16, wherein the plurality of different content providers are providers of streaming video services.

18. The one or more non-transitory computer-readable media of claim 16, wherein the number of access credentials comprise a number of cryptographic keys used to access the media content in the plurality of media content libraries.

19. The one or more non-transitory computer-readable media of claim 16, wherein the access credentials comprise login details corresponding to at least one account.

* * * * *